United States Patent [19]

Jordan et al.

[11] Patent Number: 5,686,919
[45] Date of Patent: Nov. 11, 1997

[54] PROCESS FOR GENERATING WIND PROFILER DATA FREE OF FIXED GROUND CLUTTER CONTAMINATION

[76] Inventors: James R. Jordan, 1842 Joliet Way, Boulder, Colo. 80303; Russell B. Chadwick, 4371 N. 63rd St., Boulder, Colo. 80301

[21] Appl. No.: 470,546

[22] Filed: Jun. 6, 1995

[51] Int. Cl.$^6$ ............................................. G01S 13/95
[52] U.S. Cl. .................................... 342/26; 342/159
[58] Field of Search .............................. 342/26, 159, 162

[56] References Cited

U.S. PATENT DOCUMENTS

| | | | |
|---|---|---|---|
| 4,092,644 | 5/1978 | Hodge | 343/5 W |
| 4,139,847 | 2/1979 | Shimzu et al. | 343/5 W |
| 4,318,100 | 3/1982 | Shimzu et al. | 343/5 W |
| 4,575,723 | 3/1986 | Turner et al. | 343/7.7 |
| 4,628,318 | 12/1986 | Alitz | 342/26 |
| 4,766,435 | 8/1988 | Wells | 342/82 |
| 5,164,731 | 11/1992 | Borden et al. | 342/26 |
| 5,327,141 | 7/1994 | Sheldon | 342/159 |
| 5,451,961 | 9/1995 | Rubin et al. | 342/159 |

*Primary Examiner*—Ian J. Lobo
*Attorney, Agent, or Firm*—Henderson & Sturm

[57] ABSTRACT

This invention discloses a process for generating wind profiler data which is free of fixed ground clutter contamination. The fixed ground clutter contamination is removed based upon the different decorrelation times of noise, clear air signals, and clutter. A nonlinear regression is used to estimate the clutter content of the radar return which is then subtracted from the time series. This process is capable of removing broadband clutter from the desired clear air signal even though both may occupy the same Doppler frequency.

5 Claims, 3 Drawing Sheets

PROCESS FOR GENERATING WIND PROFILER DATA FREE OF FIXED GROUND CLUTTER CONTAMINATION

TECHNICAL FIELD

This invention relates to wind profiling radars, and more particularly to a process for generating wind profiler data which is free of fixed ground clutter contamination.

BACKGROUND ART

Wind profiling radars have been in operation since the 1980's, many under different local conditions. One limitation to operation at many sites is contamination from fixed ground clutter, i.e. radar returns from vegetation, buildings, and power lines. Radar returns from other moving targets such as cars, airplanes, and water waves can also contaminate wind measurements.

Clear air radars, such as wind profilers, measure the wind by measuring the Doppler shift of transmitted pulses of electromagnetic energy caused by turbulent eddies moving along with the atmosphere. Some of the energy in these pulses is reflected back towards the antenna by temperature and humidity gradients in the turbulence. Since this turbulent atmosphere is distributed throughout the region of the atmosphere illuminated by a pulse as it travels outward, the return signal measured by the radar has rapid fluctuations caused by the random motion of the turbulence. Signals from point targets such as airplanes or ground clutter are sine waves with little fluctuation.

The fluctuations from distributed turbulence cause the radar signal to decorrelate in a shod time. The decorrelation time is defined as the time for the autocorrelation function to fall to 37% of its original value. The autocorrelation function is a mathematical way to tell how long it takes for a signal to change significantly. In the case of radar signals, fluctuations are related to how long the eddies of turbulence persist in the atmosphere so the decorrelation time for a 915 MHz radar is about 40 msec. Radar signals from ground clutter such as power lines blowing in the wind remain relatively constant much longer than clear air signals and therefore can be separated and removed from the radar signal.

The velocity of the wind is measured from the Doppler shift of the transmitted electromagnetic pulses. The Doppler shift is determined by the difference in frequencies between the transmitted and received signals. This difference in frequency is then split into two channels, in-phase or I and quadrature-phase or Q. These two channels allow the radar to tell which direction the wind is blowing. The I and Q channels are then sampled to produce a time series which is typically 64 samples long. The power spectrum of the sampled time series is then calculated to find the frequency of the Doppler shift and thus the velocity of the wind.

A non-linear regression is a general term for the process of making an equation that describes some set of data points. Regression techniques try to "fit" the data so there is the least possible difference between the real data points and the calculated equation for those points. A linear fit is a straight line and a non-linear fit can be any equation that is not a straight line. A polynomial fit uses the equation:

$$y = C_0 + C_1 x + C_2 x^2 + C_3 x^3 + \ldots + C_n x^n$$

where:
  y=Calculated data point
  x=Time sample
  $C_n$=Coefficients
  n=order of polynomial.

Several equations must be solved simultaneously in order to find the coefficients, which requires several matrix operations. However, since x is always the same for each time series, most of the problem can be pre-calculated and stored, leaving two matrix multiples to solve for the coefficients.

DISCLOSURE OF THE INVENTION

This invention discloses a process for generating wind profiler data which is free of fixed ground clutter contamination. The fixed ground clutter contamination is removed based upon the different decorrelation times of noise, clear air signals, and clutter. A non-linear regression is used estimate the clutter content of the radar return which is then subtracted from the time series. This process is capable of removing broadband clutter from the desired clear air signal even though both may occupy the same Doppler frequency.

BRIEF DESCRIPTION OF THE DRAWINGS

The invention will become more clear upon a thorough study of the following description of the best mode, particularly when reviewed in conjunction with the drawings, wherein.

BEST MODE FOR CARRYING OUT THE INVENTION

The signals from a clear air radar in a clutter environment are a combination of noise, clear air signals, and clutter signals, each having different characteristics and decorrelation times. The noise is a zero mean, Gaussian random signal that decorrelates from one sample to the next. The clear air signal is a zero mean, Gaussian random signal that decorrelates in about 40 msec for a 915 MHz radar. The clutter signal is a slowly varying signal that remains correlated for most of the sampling time.

Figure 1:
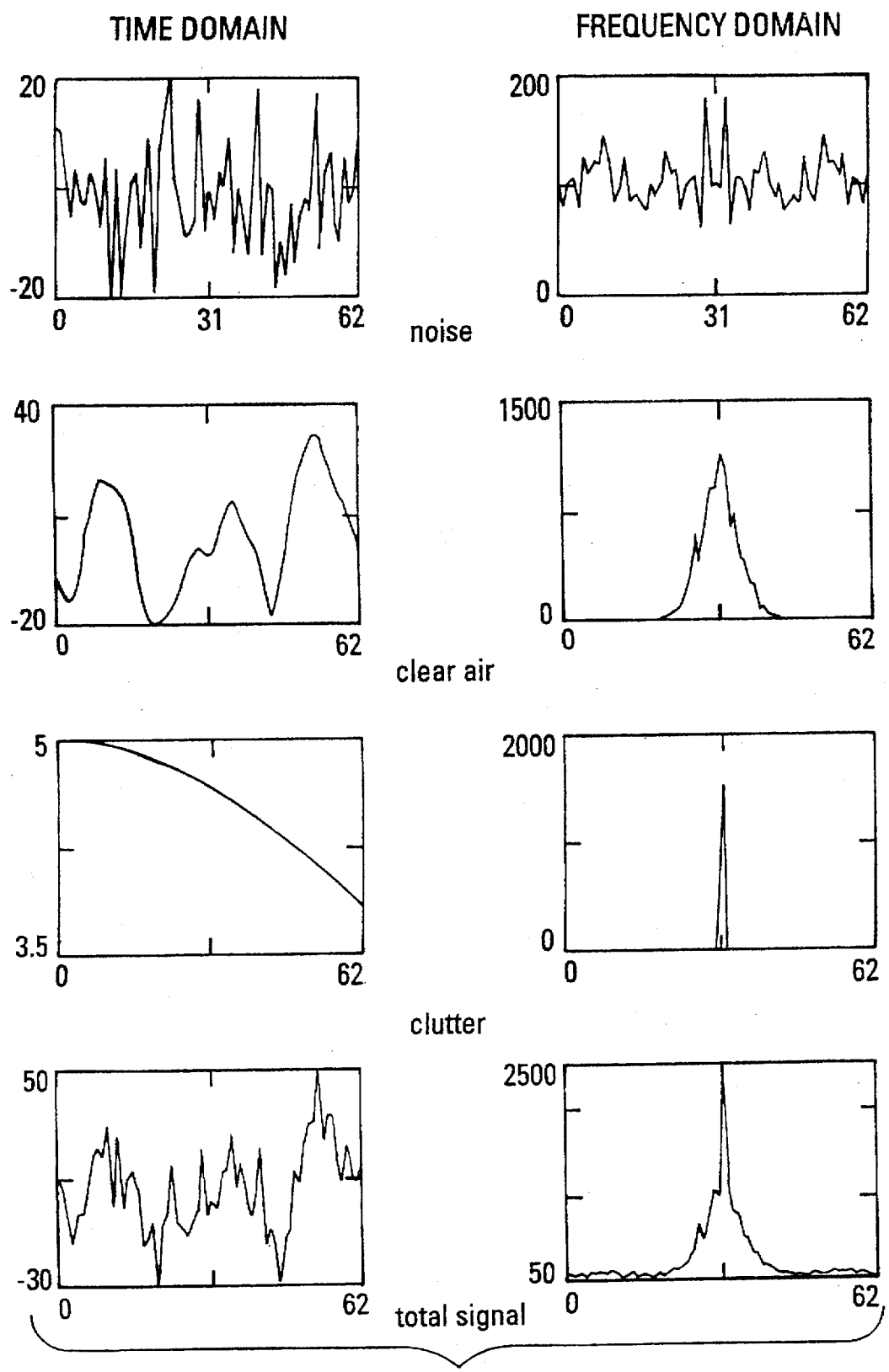
FIG. 1 depicts the real and Doppler spectra of a simulated time series for the noise, clear air, and clutter signals and their corresponding sum representing a real radar signal.

FIG. 1 shows the real part of a simulated time series for each of the three signals on the left and their corresponding Doppler spectra on the right. Also shown is the sum of the three signals which is how a real radar signal and its Doppler spectrum would appear. This clutter rejection technique relies upon the difference in decorrelation times of noise, clear air signals, and clutter. A non-linear regression is used to estimate the clutter portion of the signal which is then subtracted from the time series, leaving the desired noise and clear air signals unchanged.

The clutter removal algorithm uses a non-linear polynomial fit to estimate the clutter content of the signal, although any non-linear regression technique could be used. The algorithm starts with a first order polynomial (linear) fit, subtracts it from the time series, then calculates a second order polynomial and checks if the second order is a better estimate of the clutter than the first order polynomial. If the second order polynomial is a better fit, the third order fit is calculated and tested. The order of polynomial fit then is increased until the clutter estimate is optimal or the maximum order polynomial has been reached. The removal algorithm is done on both the I and Q time series separately for each range gate.

Figure 2:
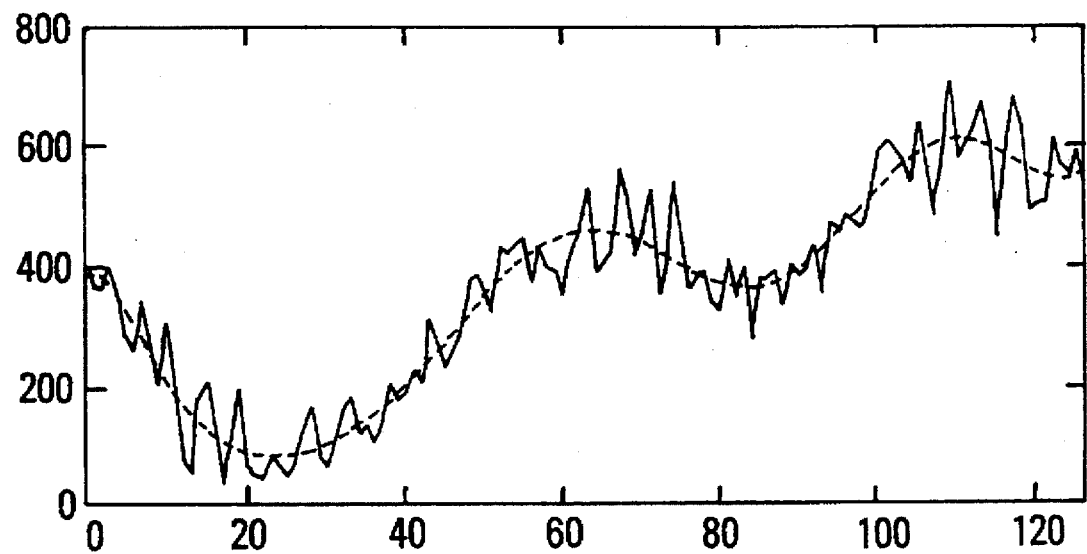
FIG. 2 depicts a real time series with severe clutter.
Figure 3:
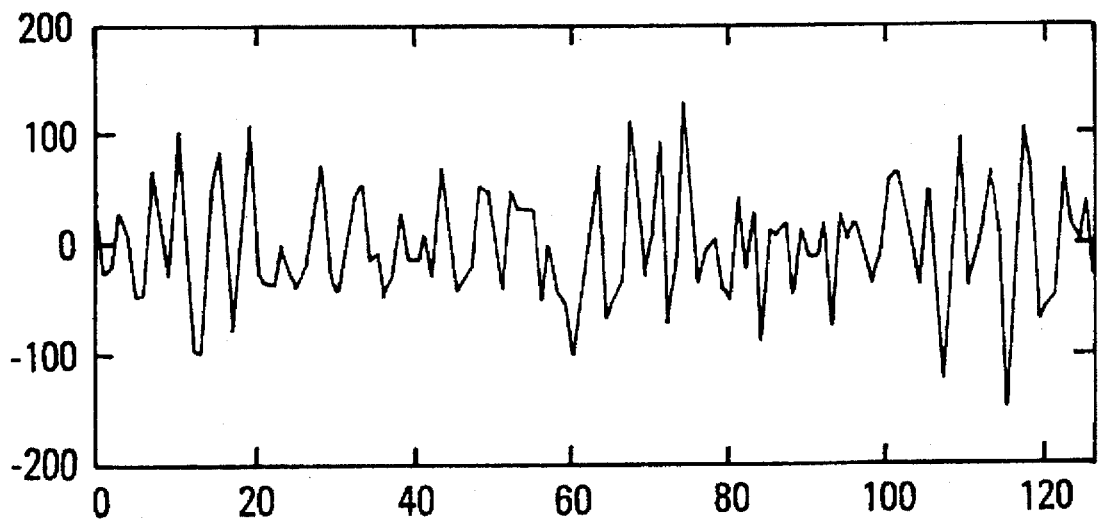
FIG. 3 depicts the same data as FIG. 2 with the clutter estimate removed.

FIG. 2 is an example of a real time series with severe clutter present. The dashed line is a 10th order polynomial fit to the data and is the best estimate of the clutter. In FIG. 3, the clutter estimate of FIG. 2 has been subtracted away.

It is necessary to know when the optimal order polynomial has been reached. If the order of the polynomial is too small, broad band clutter will not be completely removed. If the order of the polynomial is too large, the low frequency components of the noise and clear air signal will be subtracted away with the clutter and leave a notch at zero in the Doppler spectrum. Therefore testing for the optimal clutter estimate is an important part of the clutter removal algorithm.

Figure 4:
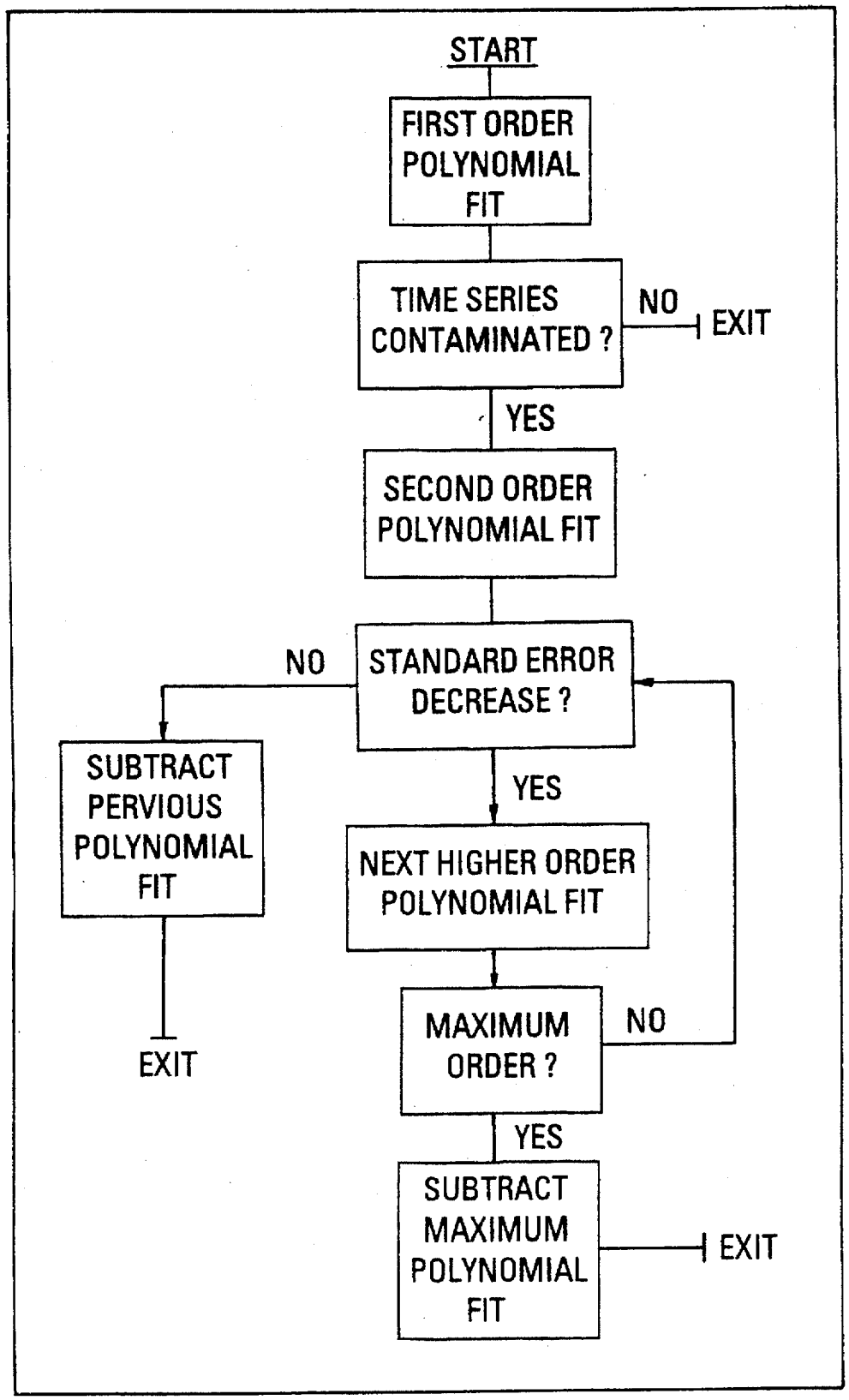
FIG. 4 is a flow diagram of the clutter removal algorithm.

FIG. 4 shows the details of the clutter removal algorithm. First, test for clutter contamination by using a ratio test. Uncontaminated signals are zero mean, Gaussian distributed, with a standard deviation of:

$$\sigma = \sqrt{\frac{1}{N} \Sigma x_i^2} \quad (1)$$

where
$\sigma$=standard deviation
N=total number of points
$x_i$=sample point

The standard error of the estimate about a polynomial is given by:

$$\sigma_e = \sqrt{\frac{\Sigma(x_i - G_i)^2}{N - M}} \quad (2)$$

where:
$\sigma_e$=standard error of the estimate
$G_i$=value of the polynomial for each point
M=number of regression coefficients The test for clutter contamination uses the ratio of (1) to (2) for a first order (linear) fit of the time series. If there is no clutter, the ratio should be approximately one, however, because of statistical variation the threshold for the test is set to 0.9. If the ratio of (1) to (2) is less than 0.9, the signal is contaminated and clutter should be removed, if greater than 0.9, clutter removal is not necessary.

If the time series is contaminated, the algorithm does a second order polynomial fit to the data and calculates the standard error. If the standard error for the second order fit is less than the standard error for the first order, the second order fit is retained and the third order fit is computed. This process of increasing the order of the fit and testing continues until the standard error increases from one order to the next, indicating that the previous order fit is the optimal one. The algorithm stops when an optimal clutter estimate has been found or the maximum order polynomial has been reached. The algorithm then subtracts the optimal clutter estimate from the original time series and continues on to the next time series.

Typically, 915 MHz wind profilers collect 50 range gates every 30 seconds, each with an I and Q time series 64 points long. If many gates are contaminated by clutter, the calculation overhead can become large. Two methods are used to reduce this calculation overhead.

First, some of the calculations are made once and stored for efficiency. The matrix equation for calculating the polynomial coefficients is:

$$C = (X^T X)^{-1} (X^T Y)$$

where:
C=matrix of coefficients
X=matrix of x values of time series
Y=matrix of y values of time series The x values are evenly spaced samples in time, numbered zero to the number of FFT points minus one. These values are constant for every time series and can be done once and stored as a K+1 square matrix for each polynomial order K. It remains to calculate the coefficients by two matrix multiplications.

Second, the method used to compute the polynomial once the coefficients are known is a standard technique that does not require raising a number to a power. Combining these two methods reduces the calculation rate to that suitable for a digital signal processor. Therefore, this clutter removal process will not significantly affect the wind profiler sampling rate.

Those skilled in the art will recognize that many modifications and variations of the present invention are possible in light of the above teachings. It is therefore to be understood that, within the scope of the appended claims, the process may be practiced otherwise than as specifically described.

What is claimed is:

1. A process for generating wind profiler data free of fixed ground clutter contamination comprising the steps of:
    (a) transmitting and receiving wind profiler radar signals;
    (b) creating a time series of said received radar signals;
    (c) estimating a first clutter component of said time series by computing a first order regression polynomial for said time series;
    (d) computing a first standard error of said first clutter component estimate;
    (e) computing a standard deviation of said time series;
    (f) determining if clutter is present by comparing said standard deviation to said first standard error; and, when clutter is determined to be present,
    (g) estimating subsequent clutter components of said time series by computing higher order regression polynomials for said time series;
    (h) computing subsequent standard errors of said subsequent clutter component estimates;
    (i) comparing said standard errors to determine an optimal clutter component estimate; and
    (j) subtracting said optimal clutter component estimate from said time series.

2. A process for generating wind profiler data free of fixed ground clutter contamination comprising the steps of:
    (a) transmitting and receiving wind profiler radar signals;
    (b) creating a time series of said received radar signals;
    (c) estimating a first clutter component of said time series by computing a first order regression polynomial for said time series;
    (d) computing a first standard error of said first clutter component estimate;
    (e) estimating subsequent clutter components of said time series by computing higher order regression polynomials for said time series;
    (f) computing subsequent standard errors of said subsequent clutter component estimates;
    (g) comparing said standard errors to determine an optimal clutter component estimate; and
    (h) subtracting said optimal clutter component estimate from said time series.

3. The process as recited in claim 2, and further comprising the steps of:

(a) computing a standard deviation of said time series; and (b) determining if clutter is present by comparing said standard deviation to said first standard error.

4. A process for generating wind profiler data free of fixed ground clutter contamination comprising the steps of:

(a) transmitting and receiving wind profiler radar signals;

(b) creating a time series of said received radar signals;

(c) estimating a first clutter component of said time series by computing a first order regression polynomial for said time series;

(d) computing a first standard error of said clutter component estimate;

(e) computing a standard deviation of said time series;

(f) determining if clutter is present by comparing said standard deviation to said first standard error.

5. The process as recited in claim 4, and further comprising the steps of:

(a) estimating a second clutter component of said time series by computing a second order regression polynomial for said time series;

(b) computing a second standard error of said second clutter component estimate;

(c) comparing said standard errors to determine an optimal clutter component estimate; and (d) subtracting said optimal clutter component estimate from said time series.

* * * * *